United States Patent
Yamada

(10) Patent No.: US 10,441,978 B2
(45) Date of Patent: Oct. 15, 2019

(54) FIBER SHEET

(71) Applicant: Kikuo Yamada, Shinagawa-ku (JP)

(72) Inventor: Kikuo Yamada, Shinagawa-ku (JP)

( * ) Notice: Subject to any disclaimer, the term of this patent is extended or adjusted under 35 U.S.C. 154(b) by 137 days.

(21) Appl. No.: 15/308,007

(22) PCT Filed: Jun. 1, 2015

(86) PCT No.: PCT/JP2015/065785
§ 371 (c)(1),
(2) Date: Oct. 31, 2016

(87) PCT Pub. No.: WO2015/182784
PCT Pub. Date: Dec. 3, 2015

(65) Prior Publication Data
US 2017/0056933 A1    Mar. 2, 2017

(30) Foreign Application Priority Data

May 30, 2014   (JP) ................. 2014-112729

(51) Int. Cl.
*B32B 27/02* (2006.01)
*B08B 1/00* (2006.01)
(Continued)

(52) U.S. Cl.
CPC ............. *B08B 1/006* (2013.01); *A47K 7/00* (2013.01); *A47K 7/03* (2013.01); *A47K 10/16* (2013.01);
(Continued)

(58) Field of Classification Search
CPC .. A47K 10/16; A47K 7/00; A47K 7/03; A47L 13/17; D21H 27/002; D21H 27/30;
(Continued)

(56) References Cited

U.S. PATENT DOCUMENTS 4,741,944 A   5/1988   Jackson et al.
5,716,703 A   2/1998   Payne
(Continued)

FOREIGN PATENT DOCUMENTS

JP   S50-000114   1/1975
JP   S61-033628   2/1986
(Continued)

OTHER PUBLICATIONS

WO2014098683 (Een et al), Jun. 26, 2014.*
(Continued)

*Primary Examiner* — Lawrence D Ferguson
(74) *Attorney, Agent, or Firm* — Oblon, McClelland, Maier & Neustadt, L.L.P.

(57) ABSTRACT

A fiber sheet having both a bulky feel and softness is provided. A fiber sheet (1) is provided with a surface sheet layer (5) and a softness imparting layer (6). The fiber sheet (1) is subjected to embossing and a binder is applied to the fiber sheet (1). The softness imparting layer (6) is constituted by a plurality of fibers; and the fibers exist densely in a compressed state in a region of a boundary face between the surface sheet layer (5) and the softness imparting layer (6). Additionally, the surface sheet layer (5) is a paper material formed from pulp paper or a material including pulp as a principal raw material; and the softness imparting layer (6) is formed from crushed pulp or a material including crushed pulp as a principal raw material. Furthermore, the surface sheet layer (5) is manufactured by a paper making process; and the softness imparting layer (6) is formed by laminating crushed pulp along a flow of an airflow on a surface of the surface sheet. Moreover, depressions are formed via the embossing and, thereafter, the binder is applied.

24 Claims, 3 Drawing Sheets

(51) Int. Cl.

| | | |
|---|---|---|
| *A47K 7/00* | (2006.01) | |
| *A47L 13/17* | (2006.01) | |
| *B32B 5/26* | (2006.01) | |
| *A47K 7/03* | (2006.01) | |
| *A47K 10/16* | (2006.01) | |
| *B32B 37/24* | (2006.01) | |
| *B32B 38/06* | (2006.01) | |
| *D21H 27/00* | (2006.01) | |
| *D21H 27/30* | (2006.01) | |
| *D21H 27/32* | (2006.01) | |
| *D21H 27/38* | (2006.01) | |

(52) U.S. Cl.
CPC ............... *A47L 13/17* (2013.01); *B08B 1/00* (2013.01); *B32B 5/26* (2013.01); *B32B 37/24* (2013.01); *B32B 38/06* (2013.01); *D21H 27/002* (2013.01); *D21H 27/30* (2013.01); *D21H 27/32* (2013.01); *D21H 27/38* (2013.01); *B32B 2037/243* (2013.01); *B32B 2309/105* (2013.01); *B32B 2555/00* (2013.01)

(58) Field of Classification Search
CPC .......... D21H 27/32; B08B 1/00; B08B 1/006; B32B 2037/243; B32B 2309/105; B32B 2555/00; B32B 37/24; B32B 38/06; B32B 5/26

See application file for complete search history.

(56) References Cited

U.S. PATENT DOCUMENTS

| | | | |
|---|---|---|---|
| 5,840,787 A | | 11/1998 | West et al. |
| 5,849,153 A | | 12/1998 | Ishino et al. |
| 5,851,352 A | | 12/1998 | Vinson et al. |
| 5,902,454 A | | 5/1999 | Nelson |
| 5,938,894 A | | 8/1999 | Thebrin et al. |
| 6,015,582 A | * | 1/2000 | Kageyama ........... B65D 81/264 206/204 |
| 6,127,593 A | | 10/2000 | Bjorkquist et al. |
| 6,127,594 A | | 10/2000 | Rosseland |
| 6,149,769 A | | 11/2000 | Mohammadi et al. |
| 6,187,137 B1 | | 2/2001 | Druecke et al. |
| 6,187,141 B1 | | 2/2001 | Takeuchi et al. |
| 6,207,278 B1 | | 3/2001 | Jewell et al. |
| 6,207,596 B1 | | 3/2001 | Rourke et al. |
| 6,231,721 B1 | | 5/2001 | Quick et al. |
| 6,264,791 B1 | | 7/2001 | Sun et al. |
| 6,365,794 B1 | | 4/2002 | Dabi et al. |
| 6,379,497 B1 | | 4/2002 | Sandstrom et al. |
| 6,433,245 B1 | | 8/2002 | Bjorkquist et al. |
| 6,436,234 B1 | | 8/2002 | Chen et al. |
| 6,451,718 B1 | | 9/2002 | Yamada et al. |
| 6,471,824 B1 | | 10/2002 | Jewell |
| 6,537,680 B1 | | 3/2003 | Norlander et al. |
| 6,547,927 B1 | | 4/2003 | Takeuchi et al. |
| 6,547,928 B2 | | 4/2003 | Barnholtz et al. |
| 6,551,706 B1 | | 4/2003 | Jewell et al. |
| 6,565,708 B2 | | 5/2003 | Ikeda et al. |
| 6,572,919 B2 | | 6/2003 | Westland et al. |
| 6,579,414 B2 | | 6/2003 | Jewell |
| 6,579,415 B2 | | 6/2003 | Jewell |
| 6,602,994 B1 | | 8/2003 | Cash et al. |
| 6,620,865 B2 | | 9/2003 | Westland et al. |
| 6,630,054 B1 | | 10/2003 | Graef et al. |
| 6,635,799 B1 | | 10/2003 | Osborn, III et al. |
| 6,649,025 B2 | | 11/2003 | Mills et al. |
| 6,669,878 B2 | | 12/2003 | Yamada et al. |
| 6,703,125 B1 | | 3/2004 | Jewell et al. |
| 6,712,934 B2 | | 3/2004 | Ahlgren et al. |
| 6,719,862 B2 | | 4/2004 | Quick et al. |
| 6,720,057 B1 | | 4/2004 | Neumayr et al. |
| 6,748,671 B1 | | 6/2004 | Vrbanac et al. |
| 6,752,944 B2 | | 6/2004 | Jewell et al. |
| 6,764,988 B2 | | 7/2004 | Koenig et al. |
| 6,769,199 B2 | | 8/2004 | Vrbanac et al. |
| 6,782,637 B2 | | 8/2004 | Yancey et al. |
| 6,821,940 B2 | | 11/2004 | Bullock et al. |
| 6,862,819 B2 | | 3/2005 | Vrbanac et al. |
| 6,865,822 B2 | | 3/2005 | Vrbanac et al. |
| 6,905,748 B2 | | 6/2005 | Sosalla |
| 6,910,285 B2 | | 6/2005 | Vrbanac et al. |
| 7,018,508 B2 | | 3/2006 | Yancey et al. |
| 7,074,301 B2 | | 7/2006 | Hamed et al. |
| 7,074,845 B2 | | 7/2006 | Laleg |
| 7,094,317 B2 | | 8/2006 | Lundberg et al. |
| 7,094,318 B2 | | 8/2006 | Named et al. |
| 7,101,612 B2 | | 9/2006 | Lang et al. |
| 7,166,190 B2 | | 1/2007 | Graef et al. |
| 7,169,458 B2 | | 11/2007 | Underhill et al. |
| 7,290,353 B2 | | 11/2007 | Yancey et al. |
| 7,294,230 B2 | | 11/2007 | Flugge-Berendes et al. |
| 7,320,740 B2 | | 1/2008 | Hamed et al. |
| 7,323,438 B2 | | 1/2008 | Hedges et al. |
| 7,334,347 B2 | | 2/2008 | Mann et al. |
| 7,384,506 B2 | | 6/2008 | Underhill et al. |
| 7,419,568 B2 | | 9/2008 | Hamed et al. |
| 7,449,095 B2 | | 11/2008 | Hanatani et al. |
| 7,585,392 B2 | | 9/2009 | Kokko et al. |
| 7,615,278 B2 | | 11/2009 | Evers Smith et al. |
| 7,622,022 B2 | | 11/2009 | Skaggs et al. |
| 7,625,962 B2 | | 12/2009 | Laleg |
| 7,655,112 B2 | | 2/2010 | Koslow |
| 7,741,234 B2 | | 6/2010 | Smith et al. |
| 7,744,723 B2 | | 6/2010 | Sheehan et al. |
| 7,745,685 B2 | | 6/2010 | Fell et al. |
| 7,749,355 B2 | | 7/2010 | Knobloch et al. |
| 7,749,356 B2 | | 7/2010 | Runge et al. |
| 7,867,362 B2 | | 1/2011 | Allen et al. |
| 7,884,037 B2 | | 2/2011 | Sirovatka et al. |
| 7,927,457 B2 | | 4/2011 | Shannon et al. |
| 7,951,266 B2 | | 5/2011 | Kokko et al. |
| 7,972,476 B2 | | 7/2011 | Scherb et al. |
| 7,972,477 B2 | | 7/2011 | Skaggs et al. |
| 7,993,490 B2 | | 8/2011 | Runge et al. |
| 8,030,365 B2 | | 10/2011 | Mohan et al. |
| 8,034,847 B2 | | 10/2011 | Mohan et al. |
| RE42,968 E | | 11/2011 | Sheehan et al. |
| 8,123,906 B2 | | 2/2012 | Soane et al. |
| 8,138,106 B2 | | 3/2012 | Hamed et al. |
| 8,157,958 B2 | | 4/2012 | Duarte Villa et al. |
| 8,211,271 B2 | | 7/2012 | Polat et al. |
| 8,257,553 B2 | | 9/2012 | Zwick et al. |
| 8,328,987 B2 | | 12/2012 | Beaupre et al. |
| 8,349,443 B2 | | 1/2013 | Fugitt et al. |
| 8,377,526 B2 | | 2/2013 | Mohan et al. |
| 8,382,947 B2 | | 2/2013 | Skaggs et al. |
| 8,383,529 B2 | | 2/2013 | Ono et al. |
| 8,455,077 B2 | | 6/2013 | Vinson et al. |
| 8,557,269 B2 | | 10/2013 | Kleinwaechter et al. |
| 8,591,982 B2 | | 11/2013 | Lundberg et al. |
| 8,603,297 B2 | | 12/2013 | Zwick et al. |
| 8,647,470 B2 | | 2/2014 | Esser |
| 8,657,997 B2 | | 2/2014 | Polat et al. |
| 8,663,425 B2 | | 3/2014 | Noishiki et al. |
| 8,741,105 B2 | | 6/2014 | Beaupre et al. |
| 8,758,565 B2 | | 6/2014 | Singh et al. |
| 8,834,679 B2 | | 9/2014 | Kim et al. |
| 8,877,678 B2 | | 11/2014 | Koyama et al. |
| 2002/0106478 A1 | | 8/2002 | Hayase et al. |
| 2003/0070262 A1 | | 4/2003 | Andersen |
| 2009/0165235 A1 | | 7/2009 | Yasumitsu et al. |
| 2012/0177888 A1 | | 7/2012 | Escafere et al. |
| 2012/0227203 A1 | | 9/2012 | Ouellette et al. |

FOREIGN PATENT DOCUMENTS

| | | |
|---|---|---|
| JP | 2-103397 | 8/1990 |
| JP | H02-103397 U | 8/1990 |
| JP | 03-286727 A | 12/1991 |
| JP | 3-286727 A | 12/1991 |
| JP | H07-024636 | 3/1995 |
| JP | 2549159 | 8/1996 |

(56) References Cited

FOREIGN PATENT DOCUMENTS

| | | |
|---|---|---|
| JP | 2869096 | 12/1998 |
| JP | 2978182 | 9/1999 |
| JP | 2000-511833 A | 9/2000 |
| JP | 2002-529375 | 9/2002 |
| JP | 2003-61885 A | 3/2003 |
| JP | 2003-79530 A | 3/2003 |
| JP | 2003-535230 A | 11/2003 |
| JP | 2004-316024 | 11/2004 |
| JP | 2005-146451 | 6/2005 |
| JP | 3756877 | 1/2006 |
| JP | 2006-150695 | 6/2006 |
| JP | 2006-280616 | 10/2006 |
| JP | 2007-015379 | 1/2007 |
| JP | 2007-061445 A | 3/2007 |
| JP | 2007-075510 | 3/2007 |
| JP | 4052991 | 12/2007 |
| JP | 4097583 | 3/2008 |
| JP | 2008-167784 | 7/2008 |
| JP | 4219267 | 11/2008 |
| JP | 4219323 | 11/2008 |
| JP | 4301996 | 5/2009 |
| JP | 4315893 | 5/2009 |
| JP | 4317434 | 5/2009 |
| JP | 2009-136365 A | 6/2009 |
| JP | 2009-178454 | 8/2009 |
| JP | 4540470 | 7/2010 |
| JP | 2010-202986 | 9/2010 |
| JP | 4619110 | 11/2010 |
| JP | 4703534 | 3/2011 |
| JP | 2011-074543 | 4/2011 |
| JP | 4713718 | 4/2011 |
| JP | 4733070 | 4/2011 |
| JP | 4753738 | 6/2011 |
| JP | 2011-153387 | 8/2011 |
| JP | 4818063 | 9/2011 |
| WO | WO 00/14333 A1 | 3/2000 |
| WO | 2007/080860 A1 | 7/2007 |

OTHER PUBLICATIONS

International Search Report dated Aug. 18, 2015 in PCT/JP2015/065785 filed Jun. 1, 2015.
International Search Report dated Aug. 6, 2013 in PCT/JP13/002911 Filed May 1, 2013.
Japanese Office Action dated May 15, 2018 in Japanese Patent Application No. 2018-032895, citing documents AA, AO and AP therein, 5 pages.
Extended European Search Report dated Oct. 20, 2017 in European Patent Application No. 15799586.1, citing documents AB, AQ and AR therein, 7 pages.
Guo Bingchen, Nonwoven material and engineering, China Textile & Apparel Press (China), Jul. 2010 (with partial English Translation).

* cited by examiner

FIBER SHEET

TECHNICAL FIELD

The present invention relates to a fiber sheet.

BACKGROUND ART

Fiber sheets for cleaning have been widely used in cleaning work of wiping human skin, cleaning floors and cleaning around restrooms/toilets. Generally, these fiber sheets are formed by impregnating a chemical solution or similar cleaning agent in a sheet formed from a nonwoven fabric (see PTL 1).

CITATION LIST

Patent Literature

[PTL 1] Japanese Patent Application Publication No. 2003-079530

SUMMARY OF INVENTION

Technical Problem

An object of the present invention is to provide a fiber sheet having excellent feeling on the skin and excellent wiping performance.

Solution to Problem

The present invention is:

(1) A fiber sheet, including a surface sheet layer and a softness imparting layer, wherein the fiber sheet is subjected to embossing and a binder is applied to the fiber sheet.

(2) The fiber sheet according to (1), wherein the softness imparting layer is constituted by a plurality of fibers, and the fibers exist densely in a compressed state in a region of a boundary face between the surface sheet layer and the softness imparting layer.

(3) The fiber sheet according to (1) or (2), wherein the surface sheet layer is a paper material formed from pulp paper or a material including pulp as a principal raw material, and the softness imparting layer is formed from crushed pulp or a material including crushed pulp as a principal raw material.

(4) The fiber sheet according to (3), wherein the surface sheet layer is manufactured by a paper making process, and the softness imparting layer is formed by laminating crushed pulp along a flow of an airflow on a surface of the surface sheet.

(5) The fiber sheet according to any one of (1) to (4), wherein a thickness of the surface sheet layer is from 0.003 cm to 0.050 cm.

(6) The fiber sheet according to any one of (1) to (5), wherein a density of the surface sheet layer is from 0.05 g/cm$^3$ to 0.5 g/cm$^3$.

(7) The fiber sheet according to any one of (1) to (6), wherein an air permeability of the surface sheet layer is from 500 mm$^3$/(mm$^2 \times$sec) to 2000 mm$^3$/(mm$^2 \times$sec).

(8) The fiber sheet according to any one of (1) to (7), wherein depressions are formed via the embossing and, thereafter, the binder is applied.

(9) The fiber sheet according to (8), wherein the softness imparting layer includes a fiber of a length that bridges the depressions that are adjacent to each other.

(10) The fiber sheet according to any one of (1) to (9), wherein a range of the binder is 2 wt % to 9 wt %.

Advantageous Effects of Invention

An advantage of the present invention is that a fiber sheet having excellent feeling on the skin and excellent wiping performance can be provided.

DESCRIPTION OF EMBODIMENTS

First Embodiment

Figure 1:
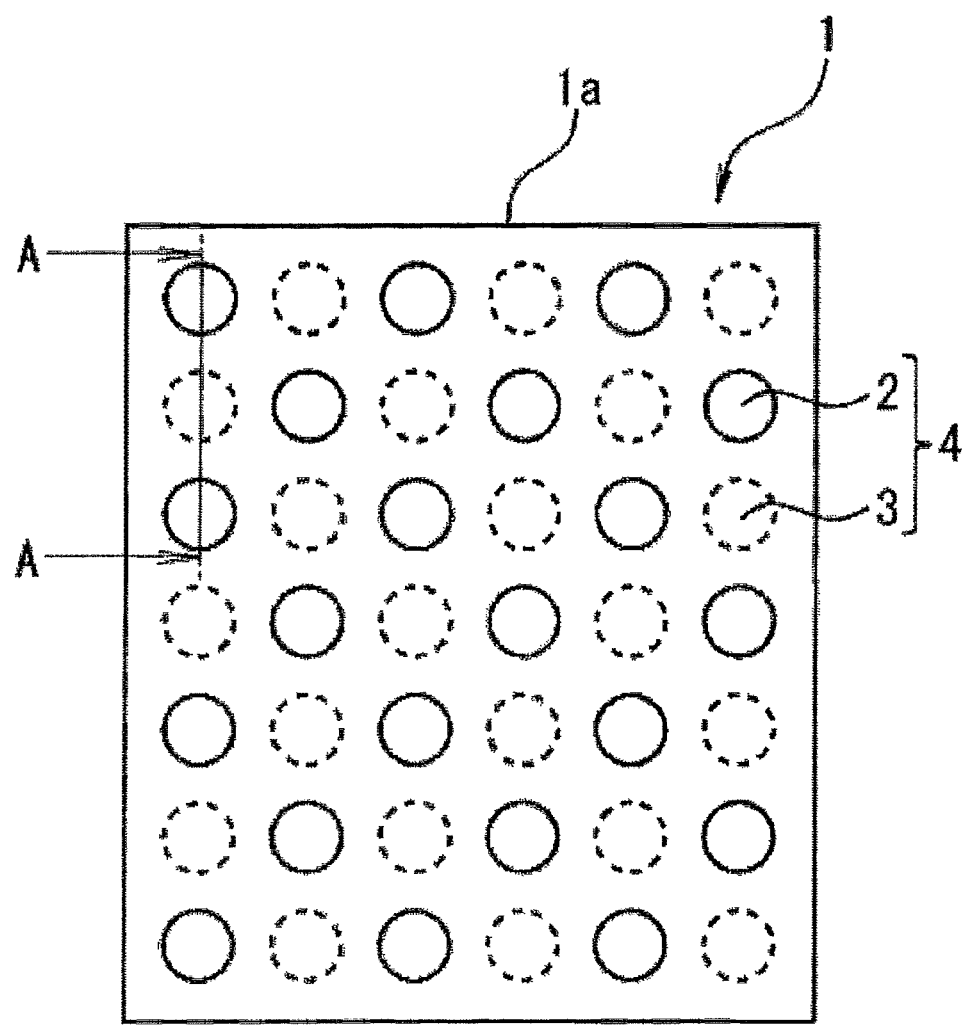
FIG. 1 is a plan view illustrating a configuration of a first embodiment of a fiber sheet according to the present invention.
Figure 2:
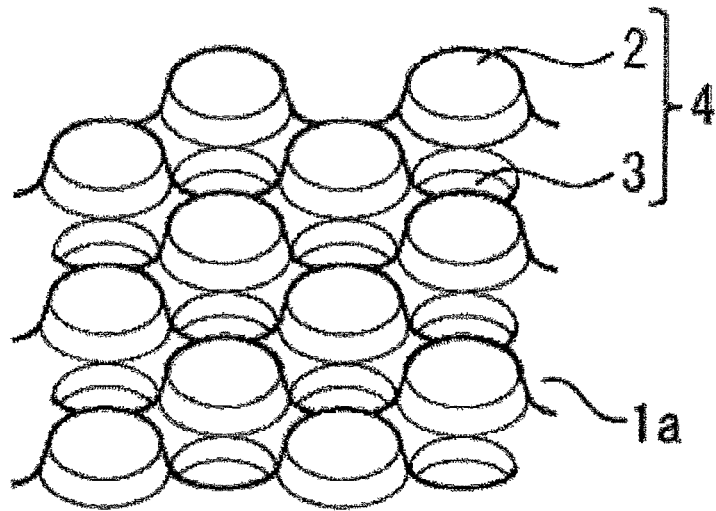
FIG. 2 is an enlarged perspective view of the fiber sheet according to the first embodiment.
Figure 3:
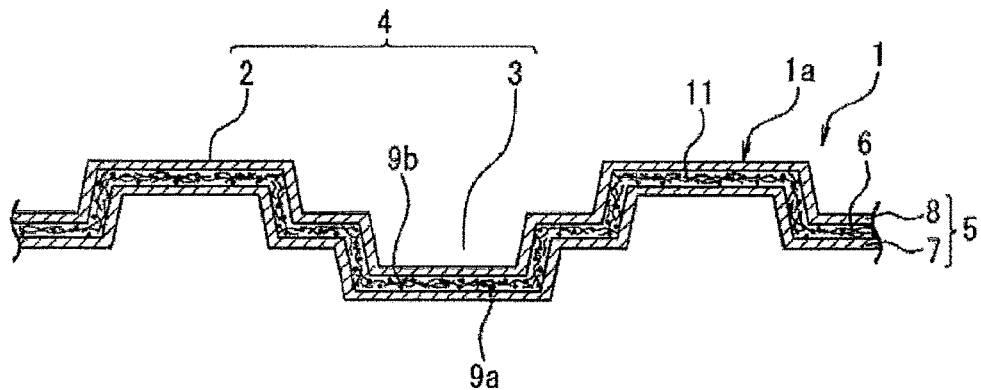
FIG. 3 is a cross-sectional view taken along line A-A of FIG. 1.

A configuration of a first embodiment of a fiber sheet 1 according to the present invention will be described while referencing FIGS. 1 to 3. FIG. 1 is a plan view illustrating a configuration of the fiber sheet 1 according to the present invention. FIG. 2 is an enlarged perspective view of the fiber sheet. FIG. 3 is a cross-sectional view taken along line A-A of FIG. 1.

As depicted in FIGS. 1 and 2, the fiber sheet 1 according to the present embodiment is configured as a sheet body of which a surface thereof is subjected to embossing and in which a plurality of protrusions 2 and depressions 3 are formed.

Hereinafter, these protrusions 2 and depressions 3 may be collectively referred to an uneven body 4. Note that shapes of the protrusions 2 and the depressions 3 of the uneven body 4 can be selected as desired.

For example, the shape of the embossing may be circular, elliptical, triangular, rectangular, or rhombic; or a different shape such as, for example, a pattern/design or a corrugated shape in which the protrusions 2 and the depressions 3 having a linear shape are repeatedly formed.

Additionally, these protrusions 2 and depressions 3 may be formed throughout an entire surface of the fiber sheet 1, or may be formed only in a portion of the fiber sheet 1. In the present embodiment, a description is given of a mode in which the uneven body 4 is formed in the surface of the fiber sheet 1 but, the uneven body 4 need not be formed in the fiber sheet according to the present invention.

As depicted in FIG. 3, the fiber sheet 1 is formed from a surface sheet layer having liquid permeability and a softness imparting layer 6 likewise having liquid permeability.

The surface sheet layer 5 is formed from a first surface sheet layer 7 and a second surface sheet layer 8, and the softness imparting layer 6 is laminated between the first surface sheet layer 7 and the second surface sheet layer 8.

That is, the fiber sheet 1 according to the present embodiment is configured so as to become a laminated body 1*a* in which the first surface sheet layer 7, the softness imparting layer 6, and the second surface sheet layer 8 are sequentially laminated. Note that hereinafter, in cases where the first surface sheet layer 7 and the second surface sheet layer 8 are described without distinction, the first surface sheet layer 7 and the second surface sheet layer 8 are referred to collectively as the surface sheet layer 5.

A binder 37 is impregnated (applied) between at least one side of the softness imparting layer 6 and the surface sheet layer 5.

Here, "between at least one side of the softness imparting layer 6 and the surface sheet layer 5" includes a mode of between the first surface sheet layer 7 and the softness imparting layer 6, a mode of between the second surface sheet layer 8 and the softness imparting layer, and a mode of between the first surface sheet layer 7 and the softness imparting layer 6 and between the second surface sheet layer 8 and the softness imparting layer 6.

Particularly, the fiber sheet 1 is configured such that the binder 37 is impregnated into the softness imparting layer 6 in a region near boundary faces 9*a* and 9*b* between the surface sheet layer 5 and the softness imparting layer 6; specifically, any of a region near the boundary face 9*a* between the first surface sheet layer 7 and the softness imparting layer 6, a region near the boundary face 9*b* between the second surface sheet layer 8 and the softness imparting layer 6, or regions near the boundary face 9*a* and the boundary face 9*b*.

Note that the boundary face 9*a* can also be expressed as a joining face where the first surface sheet layer 7 and the softness imparting layer 6 are joined, and the boundary face 9*b* can also be expressed as a joining face where the second surface sheet layer 8 and the softness imparting layer 6 are joined.

Additionally, the softness imparting layer 6 is formed from a plurality of fibers (described below), and is formed such that a degree of density of the fibers in a thickness direction varies.

The fiber sheet 1 according to the present embodiment is formed such that the fibers exist densely in a compressed state in the region of the boundary face 9*a* between the first surface sheet layer 7 as the surface sheet layer 5 and the softness imparting layer 6.

A paper material formed from pulp paper or a material including pulp as a principal raw material, which has liquid permeability, is used for the surface sheet layer 5.

The surface sheet layer 5 is manufactured by, for example, a paper making process and is formed using a paper material manufactured by subjecting a base sheet as a raw material sheet to processing by a plurality of processes.

When the surface sheet layer 5 is formed from a material including pulp as a principal raw material, the pulp preferably constitutes 30% or more, and more preferably constitutes 50% or more.

Furthermore, even more preferably, the pulp constitutes 80% or more.

When the pulp is blended at the abovementioned proportion, the flexibility of the fiber sheet 1 as a whole can be increased and production efficiency during manufacturing can be increased.

Additionally, by increasing the proportion of the pulp, it is possible to facilitate the decomposition of the fiber sheet 1 after disposal in, for example, soil.

Therefore, the environmental burden can be further reduced and concern for the environment can be raised. Note that when forming the surface sheet layer 5 from a plurality, the thickness and materials of the surface sheet layers 5 may be the same, or may be different.

Various types of raw material pulp can be used as the material of the raw material sheet. Examples of raw material pulp that can be used in the present invention include wood pulp, synthetic pulp, and waste paper pulp.

Additionally, the raw material pulp is not limited to natural fiber such as pulp, and regenerated fiber such as rayon can be also used.

Furthermore, the present invention can also use toilet paper material as the raw material pulp. In this case, for example, it is possible to use the raw material pulp constituted by blending, at predetermined proportions, softwood bleached kraft pulp obtained from softwood such as red pine, Yezo spruce, Sakhalin fir, Douglas fir, hemlock, and spruce; and hardwood bleached kraft pulp obtained from hardwood such as beech, oak, birch, eucalyptus, oak, poplar, and alder.

Preferably, a natural fiber is used as the material of the base sheet of the present invention. Examples of the natural fibers that can be used include kenaf, bamboo fiber, straw, cotton, cocoon filament, and sugarcane.

Note that the paper material used in the surface sheet layer 5 may be water-disintegrable or may not be water-disintegrable.

Additionally, the paper material used for the surface sheet layer 5 is not limited to the examples described above.

The softness imparting layer 6 is laminated between the first surface sheet layer 7 and the second surface sheet layer 8. The softness imparting layer 6 is formed from crushed pulp 11 or a material including the crushed pulp 11 as a principal raw material. Here, the term "crushed pulp 11" refers to a cotton-like material obtained by finely crushing the pulp material such as paper material that becomes the raw material, using a crusher 31.

The softness imparting layer 6 is manufactured by crushing, or similar processing, a pulp sheet 26 that becomes the raw material, using the crusher 31. Various types of pulp material can be used as the material of the crushed pulp 11.

Examples of the pulp material that can be used in the present invention include wood pulp, synthetic pulp, and waste paper pulp. Additionally, the raw material pulp is not limited to natural fiber such as pulp, and regenerated fiber such as rayon can be also used.

Furthermore, the present invention can also use toilet paper material as the raw material pulp. In this case, for example, it is possible to use the raw material pulp constituted by blending softwood bleached kraft pulp obtained from softwood such as red pine, Yezo spruce, Sakhalin fir, Douglas fir, hemlock, and spruce; and hardwood bleached kraft pulp obtained from hardwood such as beech, oak, birch, eucalyptus, oak, poplar, and alder. However, from the perspective of manufacturing, a raw material pulp constituted from softwood bleached kraft pulp is preferably used.

Preferably, a natural fiber is used as the material of the base sheet of the present invention. Examples of the natural fibers that can be used include kenaf, bamboo fiber, straw, cotton, cocoon filament, and sugarcane. Note that the material of the pulp material used when forming the softness imparting layer 6 may be different than or the same as the material forming the surface sheet layer 5.

When the material used for the softness imparting layer 6 is formed using the crushed pulp 11 as a principal raw material, a proportion of the crushed pulp 11 in the material is preferably 30% or more, and a proportion of the crushed pulp 11 in the material is more preferably 50% or more. Furthermore, even more preferably, the proportion of the crushed pulp 11 in the material is 80% or more.

As the crushed pulp is formed to be cotton-like by crushing the pulp material, it is easier to form a space between the fibers that form the crushed pulp 11 by setting the proportion at which the crushed pulp is blended as described above.

This space is formed innumerably between fiber and fiber and, therefore, in accordance with the amount of the space that is formed, the bulkiness of the softness imparting layer 6 can be increased at a lower basis weight than in the surface sheet layer 5, and a bulk forming function in the softness imparting layer 6 can be increased.

Additionally, as such, as the softness imparting layer 6 is formed from the material including crushed pulp as a principal raw material, a degree of freedom for each of the fibers to move that is obtained by forming the space between the fibers can be increased; the bulkiness of the softness imparting layer 6 can be increased; softness of the fiber sheet 1 as a whole can be increased; and production efficiency when manufacturing can be increased. Note that the term "bulk forming function" is a function of increasing the bulk of the laminated body 1a in which the surface sheet layer 5 and the softness imparting layer 6 are laminated. When the bulk forming function is described as being "high", this means that the bulk of the laminated body 1a is greater, and when the bulk forming function is described as being "low", this means that the bulk of the laminated body 1a is small.

Note that the basis weight of the crushed pulp 11 in the softness imparting layer 6 is preferably 80 g/m$^2$ or less, and more preferably 60 g/m$^2$ or less. By setting the basis weight of the crushed pulp 11 to the range described above, manufacturing and packaging of the fiber sheet 1 can be facilitated, and the fiber sheet 1 can be formed having bulk that facilitates use by a user and packaging.

Additionally, by adjusting the bulk in this manner, a large amount of the binder 37 will not be needed. Therefore, a large amount of the binder 37 adhering to the surface of the surface sheet layer 5 and forming a film can be prevented, and softness of the fiber sheet 1 as a whole can be ensured.

Additionally, in the present embodiment, as described below, the fiber sheet 1 is subjected to embossing by which a plurality of protrusions and depressions are formed.

Any of various types of binders can be used as the binder 37, provided that the binder has a predetermined adhesive strength and can impart a predetermined strength to the surface sheet layer 5 and the softness imparting layer 6.

Examples of the binder 37 that can be used in the present invention include polysaccharide derivatives, natural polysaccharides, and synthetic polymers.

Examples of the polysaccharide derivatives include carboxymethyl cellulose (CMC), carboxyethyl cellulose, carboxymethyl starch or a salt thereof, starch, methyl cellulose, and ethyl cellulose. Examples of the natural polysaccharides include guar gum, tragacanth gum, xanthan gum, sodium alginate, carrageenan, gum arabic, gelatin, and casein. Examples of the synthetic polymers include polyvinyl alcohol (PVA), ethylene-vinyl acetate copolymer resin (EVA), polyvinyl alcohol derivatives, and salts of polymers or copolymers of unsaturated carboxylic acids; and examples of the unsaturated carboxylic acids include acrylic acid, methacrylic acid, maleic anhydride, maleic acid, and fumaric acid. Of these, carboxymethyl cellulose is particularly preferably used.

A chemical composition 41 impregnated into the laminated body 1a contains a liquid that imparts cleaning functions to the paper material forming the surface sheet layer 5, and also contains liquids blended for other purposes. A water-based composition containing water, a crosslinking agent, and an organic solvent is used as the chemical composition 41 and, as necessary, a surfactant, a bactericidal agent, a preservative, a deodorant, a bleaching agent, a chelating agent, or a fragrance can be blended therein. Note that while the examples given of the chemical composition 41 include aqueous chemicals, the chemical composition 41 is not limited thereto.

The crosslinking agent causes a crosslinking reaction with the binder 37 and forms the binder 37 into a crosslinking structure. As a result, physical strength is increased. When the binder 37 having caboxyl groups such as carboxymethyl cellulose (CMC) is used, a polyvalent metal ion is preferably used as the crosslinking agent used in the chemical composition 41, and examples of the polyvalent metal ion include zinc, alkaline earth metals, manganese, nickel, cobalt, and other metal ions.

Specifically, ions of zinc, calcium, barium, cobalt, nickel can be advantageously used. These metal ions are preferable from the perspective of imparting sufficient wet strength. The polyvalent metal ion is used in the form of a water-soluble metal salt such as a sulfates, a chloride, a hydroxide, a carbonate, or a nitrate.

Examples of the organic solvent that can be used include monohydric alcohols such as ethanol, methanol, and isopropyl alcohol; glycols such as ethylene glycol, diethylene glycol, polyethylene glycol, propylene glycol, butylene glycol, and hexylene glycol; and polyhydric alcohols such as monoethers or diethers of these glycols with a lower alcohol such as methanol, ethanol, propanol, or butanol, esters of these glycols with a lower fatty acid, glycerin, and sorbitol.

Examples of the surfactant that is blended as necessary in the chemical composition 41 include anionic surfactants, non-ionic surfactants, cationic surfactants, and amphoteric surfactants and, particularly, a non-ionic surfactant such as a polyoxyalkylene alkyl ether, an alkyl glycoside, or a sorbitan fatty acid ester is preferably used.

An embodiment of a manufacturing method of the fiber sheet 1 according to the present invention will be described while referencing FIG. 4. Note that in the manufacturing method of the fiber sheet 1, "upstream side" refers to a side where the base sheet (described below) is supplied at a predetermined point in the manufacturing process, and "downstream side" refers to a side where the supplied base sheet is discharged at a predetermined point in the manufacturing process.

Figure 4:
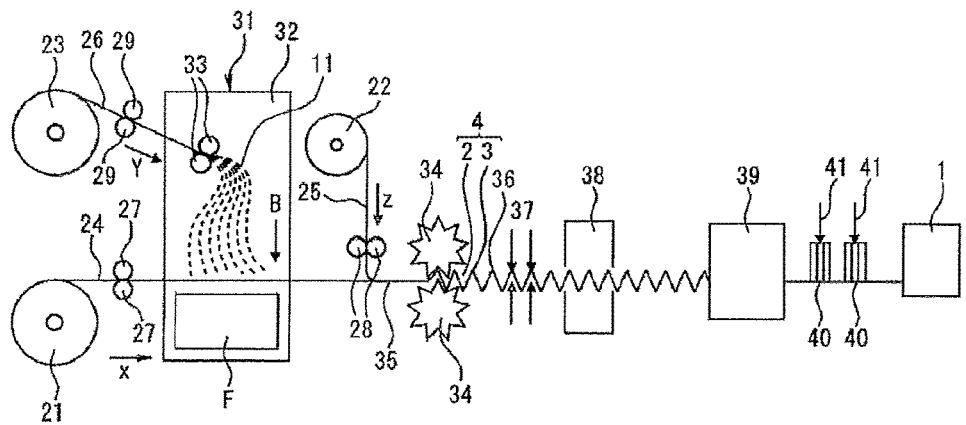
FIG. 4 is an explanatory drawing illustrating a manufacturing process of the first embodiment of the fiber sheet.

In FIG. 4, reference sign 21 is a first feeding roll on which a first base sheet 24 is wound, reference sign 22 is a second feeding roll on which a second base sheet 25 is wound, and reference sign 23 is a third feeding roll on which a pulp sheet 26 is wound.

Note that the first base sheet 24 is a base sheet for forming the first surface sheet layer 7 described above, and the second base sheet 25 is a base sheet for forming the second surface sheet layer 8 described above.

Additionally, the pulp sheet 26 is a sheet constituted by the crushed pulp 11 for forming the softness imparting layer 6. Moreover, for the first base sheet 24, the second base sheet 25, and the pulp sheet 26, a single layer structured sheet constituted by one layer of thin paper such as toilet paper may be used, or a multilayer structured sheet constituted by a plurality of layers of thin paper being layered may be used.

The first base sheet 24 is fed by a first pinch roller 27 in a direction of the X arrow so as to be fed into the crusher 31. Additionally, the pulp sheet 26 is fed by a third pinch roller 29 in a direction of the Y arrow so as to be fed into the crusher 31.

The crusher 31 is provided with a crushing part 33 inside a housing 32, and an airflow forming mechanism F that forms an airflow in the housing 32. The pulp sheet 26 is crushed by the crushing part 33 upon being fed into the crusher 31.

Then, in the housing 32, the crushed pulp (the crushed pulp 11) moves in a direction B in the drawing, while the fibers are detangled or entanglement between the fibers is relaxed by the airflow formed by the airflow forming mechanism F, and is laminated on the first base sheet 24 while being sequentially compressed.

That is, fibers of the crushed pulp 11 laminated on the surface of the first base sheet 24 is obtained as following. The pulp sheet 26 is crushed by the crushing part 33 and, thereafter, the crushed pulp 11 moves toward the surface of the first base sheet 24 along the flow of the airflow formed by the airflow forming mechanism F, and is sequentially laminated and compressed on the surface of the first base sheet 24.

Therefore, it can be said that the fibers of the crushed pulp 11 exist densely in a compressed state in the region of the boundary face with the layer formed by the fibers of the crushed pulp 11 being laminated on the surface of the first base sheet 24.

The first base sheet 24 on which the crushed pulp 11 has been laminated in the housing 32 of the crusher 31 is discharged out of the crusher 31 while moving sequentially in the X direction.

The discharged first base sheet 24 is further transported in the X direction and, on a downstream side of the crusher 31, the second base sheet 25 is laminated on the surface of the first base sheet 24 where the crushed pulp 11 is laminated.

The second base sheet 25 is fed in the Z direction by a second pinch roller 28, and is laminated on the first base sheet 24. At this point, a configuration is obtained in which the first base sheet 24, the crushed pulp 11, and the second base sheet 25 are sequentially laminated.

Hereinafter, this configuration in which the first base sheet 24, the crushed pulp 11, and the second base sheet 25 are sequentially laminated is referred to as "multi-ply sheet 35".

The multi-ply sheet 35 is passed through a pair of vertical embossing rollers 34, and is subjected to the embossing here. The embossing rollers 34 are provided with a plurality of embossing protrusions on a peripheral surface of the rollers and, as such, conventionally known embossing rollers can be used as the embossing rollers 34. Uneven shaping by the embossing may be performed on only one side of the multi-ply sheet 35, that is, the first base sheet 24 side or the second base sheet 25 side, or may be performed on both front and back sides of the multi-ply sheet 35, that is, the first base sheet 24 side and the second base sheet 25 side.

The multi-ply sheet 35 is in a non-wet state at this time. That is, the embossing is performed on the multi-ply sheet 35 that is in a non-wet state.

Herein, the non-wet state does not include the mode in which moisture is applied to the multi-ply sheet 35 such as by blowing water on the multi-ply sheet 35.

Ordinarily, paper materials include moisture (water content) corresponding to conditions of air temperature and humidity, but the moisture (water content) is not water content that is actively supplied from outside. As such, even if such moisture (water content) is included, this corresponds to the non-wet state according to the present invention.

Note that in some cases, to prevent the generation of static electricity when the crushed pulp 11 is moved and laminated by the airflow, anti-static moisture-controlled air may be applied to the crushed pulp 11. In such a case, a very small amount of the moisture-controlled air is sprayed, and the moisture-controlled air evaporates at the time of embossing. As such, this corresponds to the non-wet state.

Accordingly, the percentage content of moisture (water content) in the multi-ply sheet 35 varies depending on the conditions of air temperature and humidity, and regardless of the numeric value of the percentage content, it can be understood that this corresponds to the non-wet state according to the present invention.

As described above, in the present invention, the base sheet is subjected to embossing in a normal, dry state in atmosphere without supplying water from outside to the multi-ply sheet 35.

Accordingly, in the present invention, the embossing is not performed in a state where the binder 37 is impregnated and, as such, there is no possibility of the multi-ply sheet 35 adhering to the embossing rollers 34. Thus, there is no need to apply a releasing agent to the embossing rollers 34 or apply a releasing agent to the multi-ply sheet 35.

As a result of performing the embossing, the uneven body 4, depicted in FIGS. 1 and 2, which is formed from the plurality of protrusions 2 and depressions 3, is formed in the multi-ply sheet 35, and a bulk portion 36 is formed by a plurality of the uneven body 4.

At this time, in the present invention, the bulky feel can be increased because the crushed pulp 11 exists between the first base sheet 24 and the second base sheet 25. Thickness formed between the first base sheet 24 and the second base sheet 25 is imparted because the crushed pulp 11 exists.

In the next process, the binder 37 is applied to the multi-ply sheet 35 in which the bulk portion 36 is formed by the plurality of uneven bodies 4. Carboxymethyl cellulose (CMC), for example, is used as the binder 37. The binder 37 is applied by spraying a solution of the binder 37 from a nozzle of a spraying device onto the front surface and the back surface of the multi-ply sheet 35.

Thus, the binder 37 is applied from the front and back (outer) sides of the multi-ply sheet 35 and impregnated into the multi-ply sheet 35.

In the present embodiment, the binder 37 is sprayed onto both the front and back surfaces of the multi-ply sheet 35 and impregnated into at least one of the surface sheet layer 5 and the softness imparting layer 6, that is, more specifically, the binder 37 is impregnated into at least one of the first surface sheet layer 7, the second surface sheet layer 8, and the softness imparting layer 6. However, provided that the binder 37 is impregnated into at least either of the surface sheet layer 5 and the softness imparting layer 6, the binder 37 may be sprayed only onto the surface of one side of either the front or the back side of the multi-ply sheet 35.

A conventionally known spray nozzle may be selected as desired as the spray nozzle used in the spraying. Note that in the present embodiment, spraying is described as the means for applying the solution of the binder 37, but the means for applying the solution of the binder 37 are not limited thereto and other methods may be used.

Additionally, binders other than CMC such as polyvinyl alcohol (PVA), ethylene-vinyl acetate copolymer resin (EVA), and other substances may be used as the binder 37.

Note that in the present embodiment, a mode in which the binder 37 is sprayed on the multi-ply sheet 35 is described, but the present invention is not limited thereto. In the specification, the term "impregnated" includes all states where the binder 37 is included in the multi-ply sheet 35. That is, the application of the binder to the multi-ply sheet 35 is not limited to spraying such as is described in the present embodiment and may be applied via any other methods such as a method using a Gravure machine, or a coating machine.

When the solution of the binder 37 is applied from the outer side of the multi-ply sheet 35, the binder 37 is also impregnated in the surface of the multi-ply sheet 35.

Accordingly, the binder 37 is impregnated in the surface of the fiber sheet 1 that is ultimately manufactured. There are cases in which the binder 37 is impregnated throughout all layers in a thickness direction from one surface of the multi-ply sheet 35 to an opposing surface in the thickness direction; and cases in which the binder 37 is impregnated not to the opposing surface, but only partway, that is, there are cases in which while the binder 37 is impregnated up to at least the boundary face between the first base sheet 24 and the layer formed by the fibers of the crushed pulp 11 being laminated thereon or the boundary face between the second base sheet 25 and the layer formed by the fibers of the crushed pulp 11 being laminated thereon, the binder 37 is not impregnated into the entirety of the thickness direction of the layer formed by the fibers of the crushed pulp 11 being laminated, but rather into only a portion in the thickness direction.

This is the same for cases in which the solution of the binder 37 is applied from one side of the multi-ply sheet 35 and cases in which the solution of the binder 37 is applied from both sides of the multi-ply sheet 35.

The multi-ply sheet 35 in which the binder 37 has been impregnated is transported to a dryer 38 and, here, subjected to drying. Hot-air drying, infrared drying, or a similar conventionally known method may be selected and used as drying means.

Regarding the drying by the dryer 38 of the multi-ply sheet 35 in which the binder 37 has been impregnated, the present invention is not limited to cases of drying using a single dryer 38, rather, a configuration is possible in which a plurality of dryers 38 is provided and the multi-ply sheet 35 is dried while being sequentially transported to each of the dryers 38.

The multi-ply sheet 35 that has been dried by the dryer 38 is then sequentially subjected to a folding process, a cutting process, and a chemical composition impregnation process. In the folding process, the multi-ply sheet 35 is guided to a folding machine 39 and is folded a predetermined number of times. After the folding process, the multi-ply sheet 35 is cut to predetermined dimensions and, thus, a folded body 40 of the multi-ply sheet 35 is obtained. The chemical composition 41 is sprayed onto the folded body 40, thus impregnating the chemical composition 41 into the folded body 40.

Due to the crosslinking agent solution being sprayed onto the multi-ply sheet 35, the crosslinking agent is impregnated into the multi-ply sheet 35, a crosslinking reaction occurs between the multi-ply sheet 35 and the binder 37, and the binder 37 assumes a crosslinked structure. As a result, the strength of the multi-ply sheet 35 increases.

Thus, the fiber sheet 1 in which the chemical composition 41 is impregnated is obtained.

The uneven body 4, constituted by the plurality of protrusions 2 and the depressions 3 formed by the embossing, is formed uniformly throughout the entire surface of the fiber sheet 1 obtained in this manner, and the bulk portion 36 is formed from the uneven body 4.

The fiber sheet 1 of the present embodiment can be used as cleaning articles such as, for example, cleaning goods for cleaning toilet bowls or around toilets in restrooms; a posterior wiping material; a body wipe for wiping the body; a facial sheet, makeup remover, or toning sheet for wiping a face; a wet tissue; a wet wipe or paper rag; and a wet floor wiping sheet.

According to the present invention, a fiber sheet 1 can be provided that has predetermined strength and bulky feel in a wet state, has superior feeling on the skin, and is environmentally friendly.

Particularly, in the present embodiment, the fibers constituting the softness imparting layer 6 exist densely in a compressed state in the region of the boundary face between the surface sheet layer 5 (in the present embodiment, the first surface sheet layer 7) and the softness imparting layer 6.

The fibers that exist densely and the fibers of the surface sheet layer 5 are densely joined by the binder 37 at the locations where the fibers of the crushed pulp 11 densely exist.

As such, the strength of the surface sheet layer 5 (in the present embodiment, the first surface sheet layer 7) can be increased.

On the other hand, joining strength with the surface sheet layer 5 (in the present embodiment, the second surface sheet layer 8) is weaker at the locations where the crushed pulp 11 exists more sparsely than at the dense locations and, as such, flexibility can be increased.

That is, according to the present embodiment, the fiber sheet 1 having both strength and flexibility as a whole can be obtained.

Note that in the present embodiment, a laminating configuration is selected in which the airflow is formed in the housing 32 of the crusher 31 so that a state of the crushed pulp 11 being compressed on the first base sheet 24 is maintained. However, the method of laminating the crushed pulp 11 on the first base sheet 24 is not limited thereto.

Second Embodiment

Next, a configuration of a second embodiment of the fiber sheet according to the present invention will be described while referencing FIGS. 5 and 6.

Figure 5:
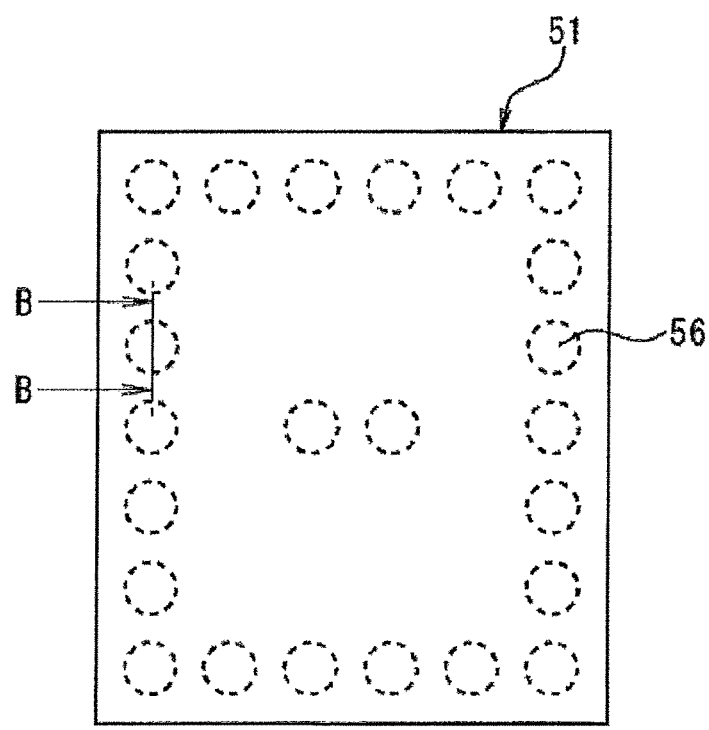
FIG. 5 is a plan view illustrating a configuration of a second embodiment of a fiber sheet according to the present invention.
Figure 6:
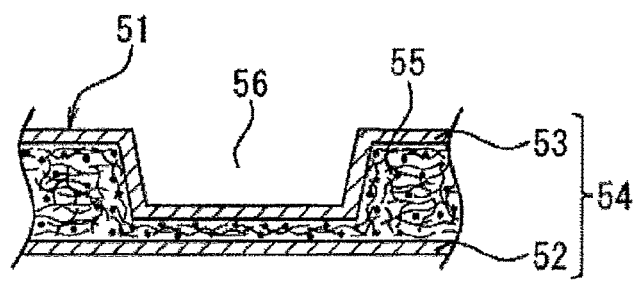
FIG. 6 is a cross-sectional view taken along line B-B of FIG. 5.

FIG. 5 is a plan view illustrating a configuration of the second embodiment of a fiber sheet according to the present invention. FIG. 6 is a cross-sectional view taken along line B-B of FIG. 5.

Note that portions configured in the same manner as in the preceding description are omitted from the description of the fiber sheet according to the present embodiment.

The fiber sheet 51 according to the present embodiment includes a surface sheet layer 54 formed from a first surface sheet layer 52 and a second surface sheet layer 53, and a softness imparting layer 55 is laminated between the first surface sheet layer 52 and the second surface sheet layer 53.

With the fiber sheet 51 according to the present embodiment, a plurality of depressions 56 made by embossing are formed in an edge portion of the fiber sheet 51.

The depression 56 is a concept including what is referred to as "spot processing" in embossing.

Here, "spot processing" is a method for performing sealing of the first surface sheet layer 52 and the second surface sheet layer 53 by pressing the second surface sheet layer 53 (described below) in a spot-like manner toward the first surface sheet layer 52.

In this case, the depression 56 is formed in the surface of the second surface sheet layer 53; and the depression 56 is not formed in the surface of the first surface sheet layer 52, which is flat.

Even with the fiber sheet 51 formed in such a manner, a fiber sheet 51 having both strength and flexibility as a whole can be obtained. Additionally, with this fiber sheet 51, better feeling on the skin can be provided.

Third Embodiment

Next, a configuration of a third embodiment of a fiber sheet 61 according to the present invention will be described while referencing FIG. 7.

Figure 7:
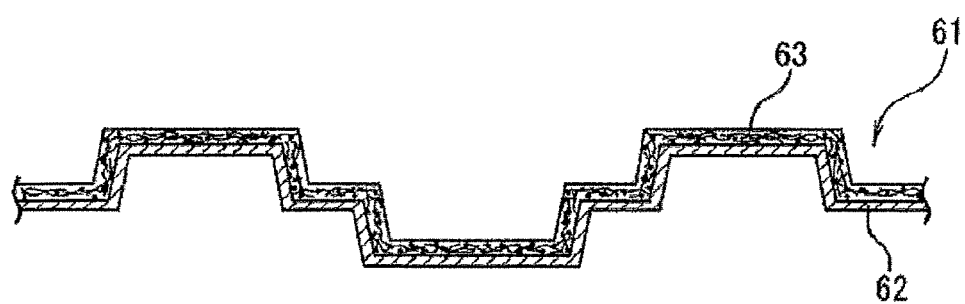
FIG. 7 is a cross-sectional view illustrating a configuration of a third embodiment of a fiber sheet according to the present invention.

FIG. 7 is a cross-sectional view illustrating a configuration of a third embodiment of the fiber sheet 61 according to the present invention. The fiber sheet 61 according to the present embodiment has a two-layer configuration in which a softness imparting layer 63 is laminated on a surface sheet layer 62.

As depicted in FIG. 7, the fiber sheet 61 is formed from a surface sheet layer 62 having liquid permeability and a softness imparting layer 63 likewise having liquid permeability. The softness imparting layer 63 is laminated on the surface sheet layer 62. That is, the fiber sheet 61 according to the third embodiment is configured so as to become a laminated body in which the surface sheet layer 62 and the softness imparting layer 63 are sequentially laminated.

Moreover, as depicted in FIGS. 1 and 2, the fiber sheet 61 according to the third embodiment is configured as a sheet of which a surface thereof is subjected to embossing and in which a plurality of protrusions 2 and depressions 3 are formed.

Additionally, a binder 37 is impregnated between at least one side of the softness imparting layer 63 and the surface sheet layer 62.

Note that specific configurations of the surface sheet layer 62, the softness imparting layer 63, the binder, the cross-linking agent, the chemical composition, and the surfactant are the same as those described in the first embodiment. Therefore, description here is omitted.

Additionally, with the exception that the second feeding roll 22 on which the second base sheet 25 is wound is not provided, the manufacturing method of the fiber sheet 61 in the present embodiment is substantially the same as that depicted in FIG. 4.

The rollers in the embossing may both be flat rollers, may be a flat roller and a protruding roller, may be a protruding roller and a depressed roller, or may be a combination of these rollers.

In the present embodiment, a thickness of the surface sheet layer 62 is preferably from 0.003 to 0.050 cm and more preferably from 0.005 to 0.010 cm; and, in the present embodiment is 0.0072 cm.

This is because if the thickness is 0.003 cm or less, it will be difficult to obtain sufficient strength, and if 0.05 cm or more, the surface sheet layer 62 will be stiff and the feel on the skin will be negatively affected, and the resulting product will not be suitable as a product that contacts the skin.

Additionally, a density of the surface sheet layer 62 of the present embodiment is preferably from 0.05 to 0.5 g/cm$^3$ and more preferably from 0.1 to 0.2 g/cm$^3$; and, in the present embodiment is 0.186 g/cm$^3$.

This is because if the density is 0.05 g/cm$^3$ or less, it will be difficult to obtain sufficient strength, and if 0.5 g/cm$^3$ or more, the surface sheet layer 62 will be stiff and the feel on the skin will be negatively affected, and the resulting product will not be suitable as a product that contacts the skin.

Additionally, air permeability of the surface sheet layer 62 is preferably from 500 to 2000 mm$^3$/(mm$^2$×sec) because the crushed pulp can be vacuumed without causing any problems to the surface sheet by setting the air permeability to this range.

Additionally, a thickness of the fiber sheet 61 of the present embodiment is preferably from 0.10 to 0.50 mm, more preferably from 0.13 to 0.30 mm, and even more preferably from 0.15 to 0.20 mm.

This is because if the thickness is 0.1 mm or less, it will be difficult to obtain sufficient strength, and if 0.5 mm or more, the fiber sheet 61 will be stiff and the feel on the skin will be negatively affected, and the resulting product will not be suitable as a product that contacts the skin.

Tables 1 and 2 show the results of measuring tensile strength and bending resistance of the two-layer fiber sheet 61 of the present embodiment in which the amount of the binder 37 (amount of the solid component binder with respect to the paper weight) was varied at 1, 2, 3, 5, 9, and 10 wt %.

In Table 1, carboxymethyl cellulose (CMC) was used as the binder 37, and in Table 2, polyvinyl alcohol (PVA) was used as the binder 37.

The tensile strength was measured in accordance with JIS L 1913, and the sample width was 50 mm. The measuring was performed in a wet state under the conditions of a tension rate of 100 mm/min and a grasp interval of 150 mm.

The bending resistance was measured in accordance with JIS L 1096A and was measured in a wet state.

TABLE 1

| Binder: CMC | | | | | | |
|---|---|---|---|---|---|---|
| Amount of binder (wt %) | 1 | 2 | 3 | 5 | 9 | 10 |
| Tensile strength (N) | 6.0 | 6.7 | 7.7 | 9.1 | 19.6 | 20.8 |
| Bending resistance (vertical/horizontal average) (mm) | 41.5 | 41.0 | 38.5 | 51.5 | 51.5 | 55.0 |

TABLE 2

| Binder: PVA | | | | | | |
|---|---|---|---|---|---|---|
| Amount of binder (wt %) | 1 | 2 | 3 | 5 | 9 | 10 |
| Tensile strength (N) | 6.3 | 8.0 | 9.6 | 11.6 | 20.4 | 27.6 |
| Bending resistance (vertical/horizontal average) (mm) | 38.5 | 40.5 | 42 | 42.5 | 48.5 | 53 |

Note that when the amount of the binder was 0%, tensile strength measurable by the measuring apparatus could not be obtained and, therefore, measurement was impossible.

Here, when the tensile strength was 6.5 N or less, there is a possibility of tearing during transport in the manufacturing process after drying. Accordingly, it is preferable that the tensile strength be 6.5 N or more.

When the bending resistance is great, the stiffness and feeling on the skin is negatively affected. When the bending resistance is 53 mm or more, the resulting product is not suitable as a product that contacts the skin. Thus, it is preferable that the bending resistance be 52 mm or less.

As shown above, when the binder is CMC, the amount of the binder is preferably from 2 to 9 wt %.

Additionally, when the binder is PVA, the amount of the binder is preferably from 2 to 9 wt %.

As described above, even with the fiber sheet 61 according to the embodiment, by laminating the softness imparting layer 63 on the surface sheet layer 62, the overall strength and flexibility of the fiber sheet 61 can be increased and the bulky feel of the fiber sheet 61 can be enhanced at a low basis weight. Thus, flexibility and strength as a whole can be imparted and, due to the fiber sheet 61, a product with better feeling on the skin can be obtained.

In the embodiment described above, when embossing, the fiber sheet is in a non-wet state. Accordingly, the embossing is performed on the fiber sheet that is in a non-wet state.

Due to the fact that the fiber sheet is subjected to compression and pressing in a non-wet state, there is no possibility of the fiber sheet adhering to the rollers, as there is in cases where the fiber sheet is subjected to compression and pressing in a wet state in which the binder is impregnated. As a result, there is no need to apply a releasing agent to the rollers or to apply a releasing agent to the fiber sheet.

As described above, with the fiber sheet of the embodiment, the thickness of the surface sheet layer 62 is preferably from 0.003 to 0.050 cm and more preferably from 0.005 to 0.010 cm. Additionally, a thickness of the fiber sheet 61 is preferably from 0.10 to 0.50 mm, more preferably from 0.13 to 0.30 mm, and even more preferably from 0.15 to 0.20 mm. As such, the fiber sheet of the embodiment is much thinner than conventional fiber sheets.

With conventional fiber sheets, in some cases, the amount of binder (solid component amount) applied is increased in order to increase the strength. In such cases, because the fiber sheet is thick, a binder layer forms on the fiber sheet surface when attempting to impregnate the binder completely within the fiber sheet. As a result, the texture of the fiber sheet is negatively affected.

With the present embodiment, because the fiber sheet is thin, the application of the binder is suitable, and a fiber sheet that is soft and has good texture can be obtained.

Fourth Embodiment

The crushed pulp 11 of a fourth embodiment includes a fiber of a length that bridges adjacent depressions. Other configurations are the same as in the third embodiment and, therefore, description here is omitted.

According to the present embodiment, a fiber that bridges adjacent depressions is compressed and pressed and exist in the softness imparting layer as a result of the embossing.

Due to the fact that the fiber bridging the adjacent depressions exists, the shape of the fiber sheet can be stably maintained, and the fiber sheet can be provided with appropriate strength and appropriate flexibility.

Moreover, the shape of the fiber sheet where the depressions are formed by the embossing (a flat roller and a protruding roller, a protruding roller and a depressed roller, or a combination of these rollers) is more stably maintained and has suitable strength.

Embodiments of the fiber sheet according to the present invention have been described in detail, but the description given above is an example of the fiber sheet according to the present invention and the present invention is not limited thereto.

For example, in the embodiments described above, a formation was described in which the embossing was performed on the surface sheet layer and the softness imparting layer, but a formation is possible in which embossing is not performed and, instead, edge portions of the surface sheet layer and the softness imparting layer are folded. Other formations are also possible.

Additionally, an example was described in which the fiber sheet of the present embodiment is used as cleaning articles in which a cleaning liquid is impregnated such as, cleaning goods for cleaning toilet bowls or around toilets in bathrooms; a posterior wiping material; a body wipe for wiping the body; a facial sheet, makeup remover, or toning sheet for wiping a face; a wet tissue; a wet wipe or paper rag; and a wet floor wiping sheet.

However, the present invention in not limited thereto. The fiber sheet of the present invention can also be used in absorbent articles such as diapers, sanitary napkins, and incontinence pads; and absorbent articles such as disposable garments, diapers, disposable sanitary napkins, and incontinence pads.

Additionally, the material used in the fiber sheet may be water-disintegrable or may not be water-disintegrable.

EXAMPLES

Working Example 1

In Working Example 1, a first base sheet formed from a paper material of a size of 100 mm×100 mm, and a second base sheet formed from the same paper material as the first base sheet having a size of 100 mm×100 mm were used. Additionally, a pulp sheet formed from pulp material was used. A basis weight of the pulp sheet was 30 $g/m^2$.

Next, the pulp sheet was crushed and, the crushed pulp formed thereafter was laminated on the first base sheet. Next, the first base sheet on which the crushed pulp was laminated was fed out of the crusher, and the second base sheet was laminated on the crushed pulp.

Thereafter, embossing was performed using embossing rolls and a bulk portion was formed by forming an uneven body. Note that hereinafter, the first base sheet in such a laminated formation is referred to as the "first surface sheet" and the second base sheet in the formation is referred to as the "second surface sheet".

Next, a binder made from carboxymethyl cellulose was sprayed from a nozzle of a spraying device on the front and back sides of the multi-ply sheet, thereby impregnating the binder in the multi-ply sheet. Thereafter, the laminated body was dried using a dryer.

Next, an aqueous solution of zinc sulfate as a crosslinking solution was sprayed on the dried laminated body, and impregnated into the dried dry body. Thereafter, the multi-ply sheet was folded a predetermined number of times by a folding machine and a folded body was formed; and a chemical composition free of crosslinking agents was sprayed on the folded body. Thus a fiber sheet in which a chemical composition is impregnated was obtained. A thickness of the fiber sheet at this time was 0.17 mm.

Peeling Test

A test was performed on the fiber sheet obtained through the process described above in which the second surface sheet was peeled from the first surface sheet, and visual confirmation as to which, of the first surface sheet and the second surface sheet, the crushed pulp constituting the softness imparting layer was adhered to was carried out.

Five sample pieces of the fiber sheet obtained through the process described above were prepared and all of these samples were subjected to this peeling test.

As a result, when the second surface sheet layer was peeled, an average value of a weight of the first surface sheet layer and the crushed pulp adhered to the first surface sheet layer was 0.49 g, and an average value of a weight of the second surface sheet layer and the crushed pulp adhered to the second surface sheet layer was 0.23 g. Thus the weight of the first surface sheet layer and the crushed pulp adhered to the first surface sheet layer was greater than the weight of the second surface sheet layer and the crushed pulp adhered to the second surface sheet layer.

A reason for this is thought to be because when laminating the crushed pulp in the crusher, the airflow is applied to the crushed first base sheet and, as such, the fibers constituting the crushed pulp are laminated at a predetermined force, the crushed pulp accumulates densely at a position near the first base sheet and, as a result, the fiber of the crushed pulp exists densely in a compressed state in the region of the boundary face between the first surface sheet layer and the softness imparting layer; and consequently, in the fiber sheet, the joining strength due to the binder between the fibers of the first surface sheet layer and the fibers of the softness imparting layer is greater than the joining strength due to the binder between the fibers of the second surface sheet layer and the fibers of the softness imparting layer.

Working Example 2

In Working Example 2, a first base sheet and a second base sheet of the same size and thickness as in Working Example 1 were used. Moreover, a fiber sheet was obtained through the same process as in Working Example 1. Working Example 2 differed from Working Example 1 in that the basis weight of the pulp sheet was 20 g/m² and the thickness of the fiber sheet was 0.13 mm.

Peeling Test

As in Working Example 1, in Working Example 2, five sample pieces of the fiber sheet were prepared and all of these samples were subjected to the peeling test.

As a result, when the second surface sheet layer was peeled, an average value of a weight of the first surface sheet layer and the crushed pulp adhered to the first surface sheet layer was 0.37 g, and an average value of a weight of the second surface sheet layer and the crushed pulp adhered to the second surface sheet layer was 0.21 g. Thus the weight of the first surface sheet layer and the crushed pulp adhered to the first surface sheet layer was greater than the weight of the second surface sheet layer and the crushed pulp adhered to the second surface sheet layer.

As expected, as in Working Example 1, when laminating the crushed pulp in the crusher, the airflow is applied to the crushed first base sheet and, the fibers constituting the crushed pulp are laminated at a predetermined force, therefore, the fiber of the crushed pulp exists densely in a compressed state at a position near the first surface sheet layer. As a result, the entanglement between the fibers of the crushed pulp and the fibers of the surface sheet layer increases and the area contacting the binder is larger.

For these reasons, it is thought that the joining strength between the crushed pulp and the surface sheet layer increases and, when peeling the first surface sheet and the second surface sheet from each other as described above, more of the crushed pulp remains on the first surface sheet side that has a higher density than on the second surface sheet side.

REFERENCE SIGNS LIST 1, 51, 61 Fiber sheet
1a Laminated body
2 Protrusion
3, 56 Depression
4 Uneven body
5, 54, 62 Surface sheet layer
6, 55, 63 Softness imparting layer
7, 52 First surface sheet layer
8, 53 Second surface sheet layer
9a, 9b Boundary face
11 Crushed pulp
24 First base sheet
25 Second base sheet
26 Pulp sheet
31 Crusher
32 Housing
33 Crushing part
34 Embossing roller
36 Bulk portion
37 Binder
38 Dryer
40 Folded body
41 Chemical composition

The invention claimed is:

1. A fiber sheet, comprising:
a first surface sheet layer and a second surface sheet layer each comprising a paper material formed from pulp paper or from a material including pulp as a principal raw material; and
a softness imparting layer comprising a plurality of fibers of crushed pulp or a plurality of fibers of a material including crushed pulp as a principal raw material, and having a fiber density varying in a thickness direction of the fiber sheet such that the fibers are dense in a first side of the softness imparting layer and are sparse in a second side of the softness imparting layer opposite to the first side,
wherein the fiber sheet is embossed to have a plurality of depressions and is applied with a binder,
the binder is applied to the fiber sheet after the fiber sheet is embossed, and
a first joining strength joining the first surface sheet layer and the softness imparting layer at the first side of the softness imparting layer is stronger than a second joining strength joining the second surface sheet layer and the softness imparting layer at the second side of the softness imparting layer.

2. The fiber sheet according to claim 1, wherein the softness imparting layer is formed by laminating crushed pulp on a surface of the first surface sheet layer while applying an airflow in the thickness direction of the fiber sheet.

3. The fiber sheet according to claim 1, wherein each of the first and second surface sheet layers has a thickness of from 0.003 cm to 0.050 cm.

4. The fiber sheet according to claim 1, wherein a density of each of the first and second surface sheet layers is from 0.05 g/cm³ to 0.5 g/cm³.

5. The fiber sheet according to claim 1, wherein an air permeability of each of the first and second surface sheet layers is from 500 mm³/(mm²×sec) to 2000 mm³/(mm²×sec).

6. The fiber sheet according to claim 1, wherein the softness imparting layer comprises a fiber having a length sufficient to bridge adjacent depressions.

7. The fiber sheet according to claim 1, wherein the binder is included in an amount of from 2 wt % to 9 wt %.

8. The fiber sheet according to claim 1, wherein the softness imparting layer includes 80% or more of pulp.

9. The fiber sheet according to claim 1, wherein the binder is applied to a surface of the first surface sheet layer opposite to a surface joined to the first side of the softness imparting layer and a surface of the second surface sheet layer opposite to a surface joined to the second side of the softness imparting layer.

10. The fiber sheet according to claim 1, wherein the fiber sheet is embossed in a dried state in atmosphere.

11. The fiber sheet according to claim 1, wherein the fiber sheet is embossed such that the first surface sheet layer has a flat shape and the second surface sheet layer has a depressed shape.

12. The fiber sheet according to claim 1, wherein the binder comprises at least one selected from the group consisting of carboxymethyl cellulose, polyvinyl alcohol, and ethylene-vinyl acetate copolymer resin.

13. The fiber sheet according to claim 1, wherein the first and second surface sheet layers of the surface sheet layer have a same thickness and composition.

14. The fiber sheet according to claim 1, wherein the fiber sheet is embossed to form the plurality of depressions uniformly throughout an entire surface of the fiber sheet.

15. The fiber sheet according to claim 1, wherein the fiber sheet does not comprise a releasing agent.

16. A fiber sheet, comprising:
- a surface sheet layer comprising a paper material formed from pulp paper or from a material including pulp as a principal raw material, the surface sheet layer having an air permeability of from 500 to 2000 mm$^3$/(mm$^2$×sec); and
- a softness imparting layer laminated on the surface sheet layer and comprising a plurality of fibers of crushed pulp or a plurality of fibers of a material including crushed pulp as a principal raw material,
- wherein the fiber sheet is compressed or pressed in a non-wet state to process at least one surface of the fiber sheet, and then applied with at least one of a binder and a water-based composition, and
- the softness imparting layer is laminated on the surface sheet layer by an airflow permeating the surface sheet layer.

17. The fiber sheet according to claim 16, wherein the fiber sheet has a bulk portion comprising depressions, protrusions, or both, such that the bulk portion increases a bulkiness of the fiber sheet.

18. The fiber sheet according to claim 16, wherein the fiber sheet is compressed or pressed by a roller.

19. The fiber sheet according to claim 16, wherein the softness imparting layer has a fiber density varying in a thickness direction of the fiber sheet such that the fibers are dense in a first side of the softness imparting layer and are sparse in a second side of the softness imparting layer opposite to the first side.

20. The fiber sheet according to claim 16, wherein the fiber sheet does not comprise a releasing agent.

21. The fiber sheet according to claim 16, wherein the softness imparting layer comprises a plurality of fibers of a material including crushed pulp as a principal raw material, and the material includes 50% or more of the crushed pulp.

22. The fiber sheet according to claim 16, wherein the crushed pulp in the softness imparting layer has a basis weight of 60 g/m$^2$ or less.

23. A method of making the fiber sheet of claim 15, comprising:
- laminating the softness imparting layer to the surface sheet layer by using the airflow such that the softness imparting layer comprises the plurality of fibers of the material comprising 50% or more of pulp and that the surface sheet layer has the air permeability of from 500 to 2000 mm$^3$/(mm$^2$×sec), thereby producing a laminated sheet;
- compressing or pressing the laminated sheet in the non-wet state to process the at least one surface of the laminated sheet; and
- applying at least one of the binder and the water-based composition to the laminated sheet.

24. A cleaning article, comprising:
the fiber sheet according to claim 16.

* * * * *